(12) United States Patent
Sardesai et al.

(10) Patent No.: US 11,558,531 B2
(45) Date of Patent: Jan. 17, 2023

(54) SYSTEMS AND METHODS FOR AUTHENTICATING AN IMAGE

(71) Applicant: Verizon Patent and Licensing Inc., Basking Ridge, NJ (US)

(72) Inventors: Ashish Sardesai, Ashburn, VA (US); Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 156 days.

(21) Appl. No.: 17/249,423

(22) Filed: Mar. 2, 2021

(65) Prior Publication Data
US 2021/0195055 A1 Jun. 24, 2021

Related U.S. Application Data

(63) Continuation of application No. 16/692,963, filed on Nov. 22, 2019, now Pat. No. 10,951,790.

(51) Int. Cl.
*H04N 1/32* (2006.01)
*H04N 5/232* (2006.01)
*H04N 1/00* (2006.01)

(52) U.S. Cl.
CPC ..... *H04N 1/32283* (2013.01); *H04N 1/00875* (2013.01); *H04N 5/23293* (2013.01); *H04N 2201/0084* (2013.01)

(58) Field of Classification Search
CPC ........... H04N 1/32283; H04N 1/00875; H04N 5/23293; H04N 2201/0084; H04N 21/8358; G06F 21/45; G06F 3/1454; H04L 9/30
See application file for complete search history.

(56) References Cited

U.S. PATENT DOCUMENTS

| | | | |
|---|---|---|---|
| 6,928,548 B1 | 8/2005 | Hale et al. | |
| 8,924,731 B2 | 12/2014 | Park et al. | |
| 10,242,185 B1* | 3/2019 | Goradia | G06F 21/552 |
| 10,277,400 B1 | 4/2019 | Griffin et al. | |
| 10,355,858 B2 | 7/2019 | Collier et al. | |
| 2008/0243934 A1* | 10/2008 | Fou | G06Q 20/1235 |
| 2010/0329572 A1 | 12/2010 | Kamay et al. | |
| 2014/0122451 A1 | 5/2014 | Euresti et al. | |
| 2016/0127410 A1* | 5/2016 | Borohovski | G06F 16/2255 726/1 |
| 2016/0171039 A1* | 6/2016 | Eisenreich | G06F 16/2365 707/698 |
| 2017/0070350 A1* | 3/2017 | Ryu | H04L 63/0838 |
| 2018/0026790 A1 | 1/2018 | Seo et al. | |

(Continued)

*Primary Examiner* — Hung H Lam

(57) ABSTRACT

An image capturing device may capture image data for processing to form an image. The image capturing device may perform a hashing procedure on the image data, wherein performing the hashing procedure generates a hash value of the image data. The image capturing device may provide, to an image authentication device, the hash value of the image data, wherein the hash value of the image data is to be used by the image authentication device to validate the image based on a request to authenticate the image received from a receiving device. The image capturing device may process the image data to form the image for display to a user. The image capturing device may provide, after providing the hash value of the image data to the image authentication device, the image for display to the user.

20 Claims, 7 Drawing Sheets

(56) References Cited

U.S. PATENT DOCUMENTS

| | | |
|---|---|---|
| 2019/0278479 A1* | 9/2019 | Smith-Uchida ....... G06F 3/0619 |
| 2019/0373134 A1 | 12/2019 | Arakawa |
| 2020/0213455 A1 | 7/2020 | Ogino |
| 2020/0296253 A1 | 9/2020 | Ichikawa |

* cited by examiner

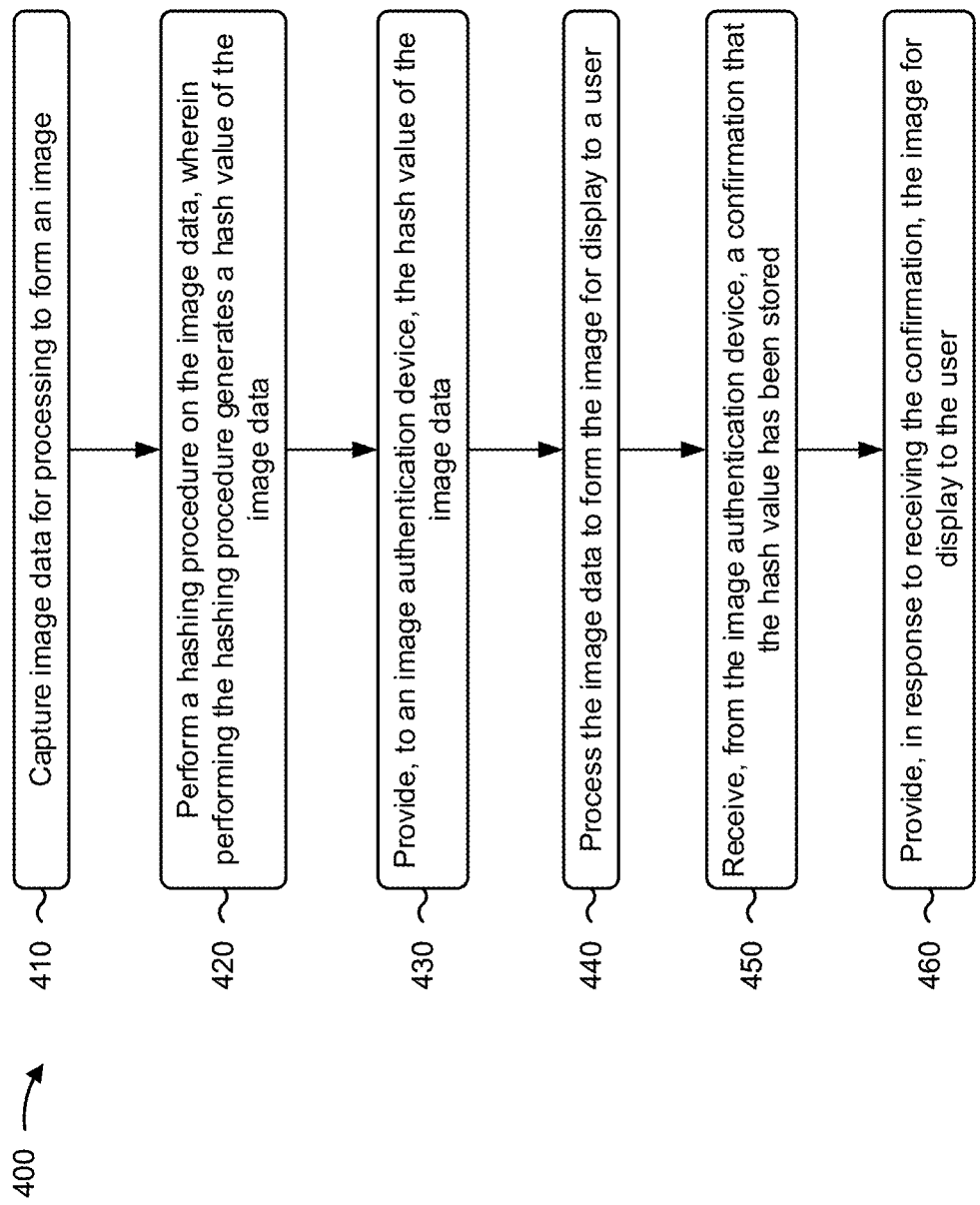

US 11,558,531 B2

SYSTEMS AND METHODS FOR AUTHENTICATING AN IMAGE

RELATED APPLICATION

This application is a continuation of U.S. patent application Ser. No. 16/692,963, entitled "SYSTEMS AND METHODS FOR AUTHENTICATING AN IMAGE," filed Nov. 22, 2019 (now U.S. Pat. No. 10,951,790), which is incorporated herein by reference in its entirety.

BACKGROUND

When a device captures image data for processing to form an image, the device may provide the image for display to a user. The user may be able to modify the image via the user device by adding elements that were not in the image as captured, removing elements from the image as captured, changing elements of the image as captured, and/or the like. The user device may provide the modified image to another user and/or another device without indicating whether the modified image has been modified.

BRIEF DESCRIPTION OF THE DRAWINGS

FIG. 4 is a flow chart of an example process for authenticating an image.

DETAILED DESCRIPTION OF PREFERRED EMBODIMENTS

Figure 1A:
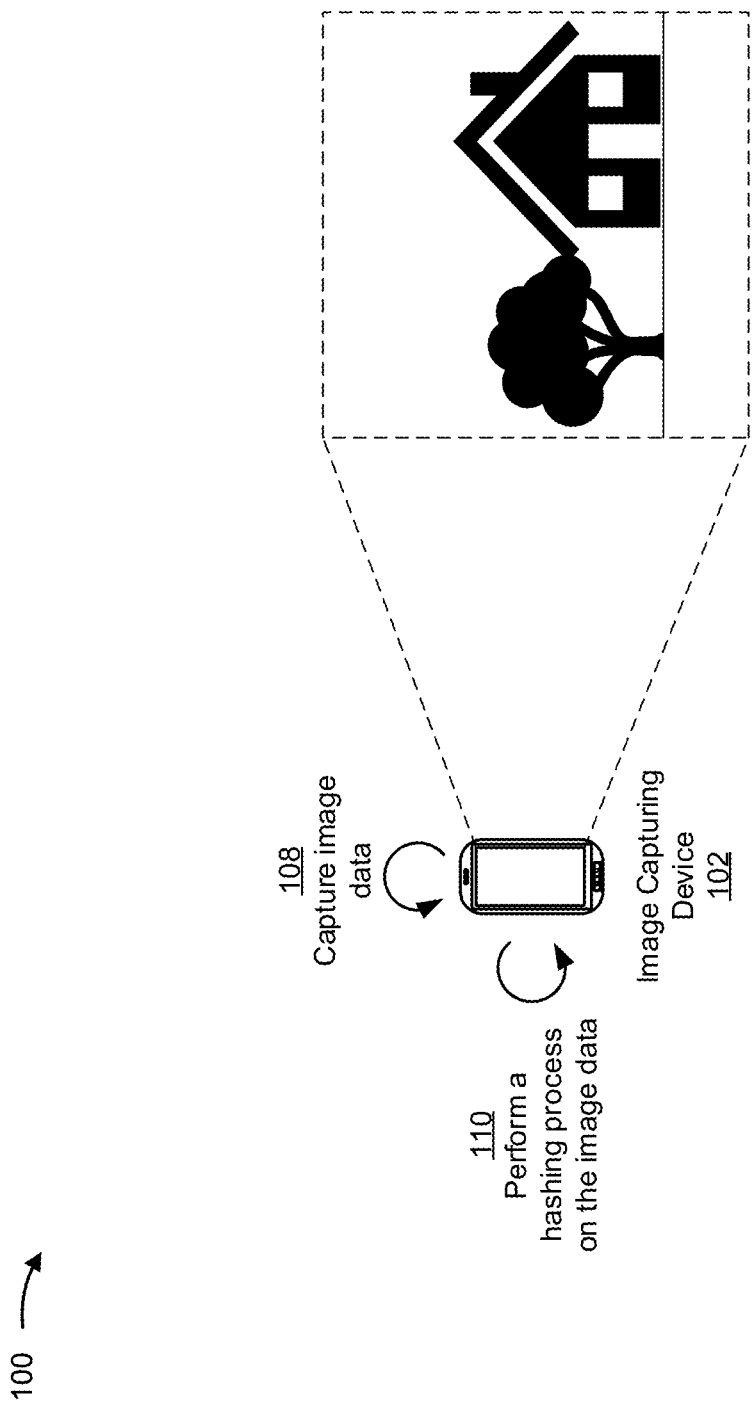
FIGS. 1A-1D are diagrams of one or more example implementations described herein.

The following detailed description of example implementations refers to the accompanying drawings. The same reference numbers in different drawings may identify the same or similar elements.

When an image capturing device captures image data, the image capturing device may provide the image for display and/or modification by a user. When the image capturing device provides the modified image to a receiving user and/or an image receiving device, the receiving user and/or the image receiving device may not be able to verify whether the image has been modified.

In some implementations, the user may provide the modified image to one or more receiving users and/or one or more receiving devices to commit fraud or otherwise deceive. For example, in a legal tribunal, the user may provide the modified image as evidence to support an allegation. In some implementations, an opposing party may use computing resources (e.g., processor resources, memory resources, power resources and/or the like) and/or networking resources to find conflicting evidence to attempt to prove that the modified image is not an authentic image (e.g., an unmodified image). In other instances of fraudulent modifications of images, the receiving user may use computing and/or networking resources to perform one or more actions under an assumption that the modified image is authentic. The receiving user may also use computing and/or networking resources to detect that the modified image is not authentic and/or to recover from consequences of assuming that the modified image is authentic.

Some implementations described herein provide an image capturing device that is configured (e.g., via an application) to capture image data for processing to form an image. Before providing the image for display and/or modification by the user, the image capturing device performs a hashing procedure (e.g., a cryptographic digest of an image) on the image data to generate a hash value of the image data. The image capturing device may generate a message that includes the hash value, an identifier associated with the image capturing device, indications of one or more attributes of the captured image data, and/or the like. The image capturing device may provide the hash value (e.g., within the message) to an image authentication device.

By virtue of the image capturing device providing a hash of the original image data (e.g., image data for the image before providing the image for display and/or modification) to the image authentication device, the image authentication device has information that may be used to validate the image (without modifications) based on a request, received from a receiving device that has received the image, to authenticate the image. In this way, a modified image can be detected and the receiving device and other devices may conserve computing and/or network resources that may otherwise be used to perform one or more actions under an assumption that the modified image is authentic, detect that the modified image is not authentic, and/or recover from consequences of user providing the modified image.

FIGS. 1A-1D are diagrams of one or more example implementations 100 described herein. As shown in FIGS. 1A-1D, the example implementation(s) 100 may include an image capturing device 102, an image authentication device 104, an image receiving device 106, and/or the like.

As shown in FIG. 1A, and by reference number 108, the image capturing device 102 may capture image data that may be processed to form an image. For example, the image capturing device 102 may capture the image data using an image capturing component such as a digital camera component, a scanning component, and/or the like. In some implementations, the image data is included in a raw image file and includes unprocessed or minimally processed data from the image capturing component. For example, the image data may include raw image data as received from a camera component, a scanning component, and/or the like. In some implementations, the image capturing device 102 may perform minimal processing to the image data, such as processing using filters specific to an image capturing component of the image capturing device (e.g., light adjustments, red-eye corrections, and/or the like). In some implementations, the image data may be insufficiently processed to be displayed or modified by a user with image editing software tools.

As shown by reference number 110, the image capturing device 102 may perform a hashing process on the image data after the image is captured. In some aspects, the hashing process is initiated based on the image capture device 102 receiving input to capture the image (e.g., via a push of a capture button). The hashing process may include applying a hashing function that, when the image data is provided as input, generates an output as a hash value based on the image data. The hashing procedure may be any type of cryptographic digest of the image data. The hashing process may generate the same hash value for the image data if the image has not been modified. In some aspects, the image capturing device 102 may disable, prior to receiving a confirmation that the hash value has been stored by the image authentication device 104, sharing tools (e.g., one or more application programming interfaces for exporting the image, uploading the image, transmitting the image and/or the like) and/or editing tools (e.g., one or more application programming interfaces for adding, removing, or otherwise modifying the image) of the image capturing device. The image capturing device 102 may enable the sharing and/or editing tools of the image capturing device after processing described herein is complete (e.g., after the hashing process is complete, after receiving a confirmation that the hash value has been stored by the image authentication device 104, and/or the like).

In some implementations, the image capturing device 102 may perform the hashing process on the image data after one or more filter processes are performed on the image data (e.g., processing filters specific to the image capturing component). In some implementations, the image capturing device 102 may create a tag and add the tag to the image data. For example, the image capturing device 102 may create an exchangeable image file format tag and update a tag with the hash value.

Figure 1B:
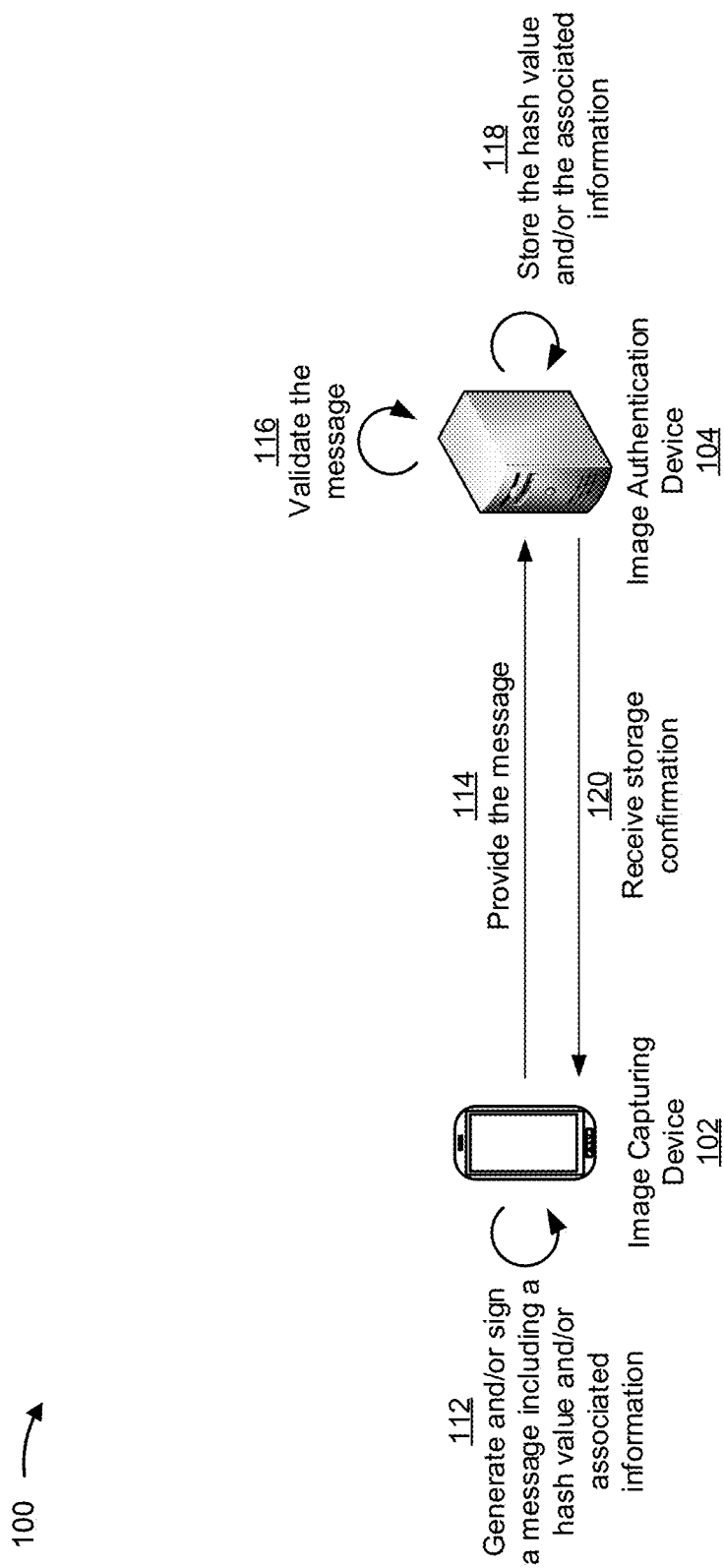

As shown in FIG. 1B, and by reference number 112, the image capturing device 102 may generate and/or sign a message that includes a hash value and associated information (e.g., an identifier associated with the image capturing device 102, one or more indications of attributes of the captured image data, and/or the like). The message may be defined as an image authentication message by including the hash value that can be used to determine if a supposed authentic copy of the image is truly authentic.

In some implementations, the identifier associated with the image capturing device 102 includes, or is derived from, one or more of a model identifier, a serial number, a public and/or private key associated with the image capturing device 102, and/or the like. In some implementations, the identifier associated with the image capturing device 102 may be used to indicate that the image capturing device 102 is the image capturing device 102 that captured the image data associated with the hash value.

In some implementations, the image capturing device 102 may determine attributes that relate to a location at which the image capturing device 102 captured the image data, a time and/or date at which the image capturing device 102 captured the image data, and/or the like. For example, the attributes may identify address information, Global Positioning System (GPS) information, and/or the like that is associated with the capture of the image data. In some implementations, the time and/or date information may be derived from an internal timing component, information received from another device (e.g., a network node, a server, and/or the like), and/or the like. In some implementations, the attributes may include the identifier associated with image capturing device 102 as a source of the image.

In some implementations, the image capturing device 102 may digitally sign the message with a digital signature generated using a private key of the image capturing device 102. The private key may be assigned to the image capturing device 102 by the image authentication device 104 or generated by the image capturing device 102 as part of an account registration process (e.g., with the image authentication device 104 or a device associated with the image authentication device 104 such as a blockchain administrator device). A public key that is associated with the private key may be known or accessible to the image authentication device 104, so that the image authentication device 104 may use the digital signature and the public key to verify the image capturing device 102 as a source of the hash value of the image data. The private key and/or the digital signature may be secured on the image capturing device 102 via a secure trusted store or enclave.

In some implementations, the image capturing device 102 may determine that a network connection is unavailable for providing the hash value of the image to the image authentication device 104. In these implementations, the image capturing device 102 may generate the message, sign the message, queue the message for transmission, and/or provide the message to image authentication device 104 when the network connection becomes available. Furthermore, the image capturing device 102 may disable sharing and/or editing of the image (e.g., via tools of the image capturing device 102) until the image capturing device 102 receives a confirmation that the image authentication device 104 has received the hash value and/or message. In some implementations, the image authentication device 104 may provide the image for display before receiving the confirmation. In other implementations, the image authentication device 104 also disables displaying the image until receiving the confirmation.

As shown by reference number 114, the image capturing device 102 may provide the message and/or the hash value to the image authentication device 104. In some implementations, the image capturing device 102 may provide the message and/or the hash value automatically and without user input. For example, an application of the image capturing device 102 may be configured to provide the message and/or the hash value to the image authentication device 104 whenever the image capturing device 102 captures an image. In some implementations, the image capturing device 102 may request, from a user of the image capturing device 102, permission to provide the message, before providing the message. For example, the image capturing device 102 may request permission to provide the message for all future captured images or may request permission for each captured image independently.

In some implementations, the image capturing device 102 may perform one or more additional hashing procedures on the image data after one or more stages of processing. In this way, the image capturing device 102 may generate one or more additional hash values for the image data that can be used to authenticate the image data at multiple stages of processing. In some implementations, the image capturing device 102 may generate one or more additional messages to provide the one or more additional hash values to the image authentication device 104. The one or more additional messages may include the signature, the identifier associated with the image capturing device 102, and/or the attributes of the captured image data. One or more of the signature, the identifier associated with the image capturing device 102, and/or attributes of the captured image data may be used to indicate that the one or more additional messages are associated with the hash value of the image data.

As shown by reference number 116, image authentication device 104 may validate the message. For example, the image authentication device 104 may validate the image based on the signature included in the message (e.g., by comparing the signature with a key associated with the image capturing device 102). By validating the message, the image authentication device 104 may determine that the image capturing device 102 has access to the image authentication device 104 and/or an authentication service provided by the image authentication device 104. In some implementations, the image authentication device 104 may provide a confirmation of receipt of the message and/or validation of the message. The confirmation may authorize the image capturing device 102, when received by the image capturing device 102, to provide the image for display and/or modification.

As shown by reference number 118, the image authentication device 104 may store hash values and/or the associated information (e.g., contents of one or more messages) in a data structure. In some implementations, the image authentication device 104 may store the contents of the message as a record (e.g., in a data structure) local to the image authentication device 104. In some implementations, the image authentication device 104 may store the contents of the message in one or more other devices. For example, the image authentication device 104 may store the contents of the message on blockchain storage in one or more other devices.

In some implementations, the image authentication device 104 may generate a registry of images in a data structure. Once a record, having a hash value, is established, the image authentication device 104 may reject subsequently received messages requesting that the image authentication device 104 stores the same hash value. This may prevent a device, that is not the image capturing device 102 that captured an image associated with the hash value, from claiming ownership of the captured image. The image authentication device 104 may notify the image capturing device 102 of an attempt to register the captured image by another device. In this way, the image authentication device 104 may detect attempts to violate ownership rights (e.g., copyright ownership) of the captured image, commit fraud, and/or the like.

As described herein, the image authentication device 104 may manage and/or maintain hash values and/or contents of one or more messages (e.g., hash values, identifiers associated with the image capturing devices, attributes of captured image data, and/or the like) using a distributed ledger. According to some implementations, the distributed ledger may enable a network of nodes that have access to the distributed ledger to access the hash values and/or the contents of one or more messages. The network of nodes may correspond to one or more devices associated with one or more entities (e.g., devices owned, operated, and/or maintained by the one or more entities) that are authorized to access or are capable of accessing the distributed ledger. In some implementations, the network of nodes may have various levels of access capabilities that may permit the network of nodes to view (e.g., read in the distributed ledger) the hash values and/or the contents of one or more messages in the distributed ledger and/or add (e.g., write) hash values and/or the contents of one or more messages stored in the distributed ledger. In this way, the image authentication device 104 provides accessibility (e.g., to any authorized entity, from any device capable of accessing the distributed ledger, regardless of time, location, and/or the like) to information (e.g., the hash values and/or the contents of one or more messages) in the distributed ledger.

Furthermore, the image authentication device 104 may use the distributed ledger to secure the data lineage information. For example, the distributed ledger may be immutable, such that no entity can edit, revise, and/or update an entry in the distributed ledger. For example, the distributed ledger may be a blockchain. In such cases, the hash values and/or the contents of one or more messages may be implemented within one or more blocks linked together in the blockchain. For example, a new transaction may be added to a block of the blockchain for a modification of the hash value and/or contents of a message when the image authentication device 104 receives a hash value and/or message from the image capturing device or another device.

In this way, the hash values and/or the contents of one or more messages can be secured in the distributed ledger while providing transparency of a history of the image and any modifications.

By providing the hash value of the image data to the image authentication device 104 to verify authenticity of the image, the image capturing device 102 may conserve computing and networking resources that may otherwise have been used to send image data in its entirety to a trusted device for storage. Additionally, the image capturing device 102 may conserve computing and network resources that may otherwise be used to verify the authenticity of the image by searching for, reviewing, and presenting corroborating evidence.

As shown by reference number 120, the image capturing device 102 may receive a storage confirmation from the image authentication device 104. For example the image capturing device may receive a confirmation that the image authentication device 104 successfully received the message and/or the hash value, that the image authentication device 104 determined that the hash value is unique (e.g., that the hash value does not match a previously received hash value), that the image authentication device 104 has successfully caused an associated record to be generated to store the hash value and/or the contents of the message, and/or the like. In some implementations, the receipt of the storage confirmation triggers and/or enables one or more actions by the image capturing device 102.

In some implementations, the image capturing device 102 may also receive an indication of a storage location of the associated record. For example, the indication of the storage location may include information that may be used by the image capturing device 102 or the image receiving device 106 to request authentication of a copy of the image. In some implementations, the image capturing device 102 may attach the indication of the storage location (e.g., in metadata) to the image before enabling sharing and/or editing of the image.

Figure 1C:
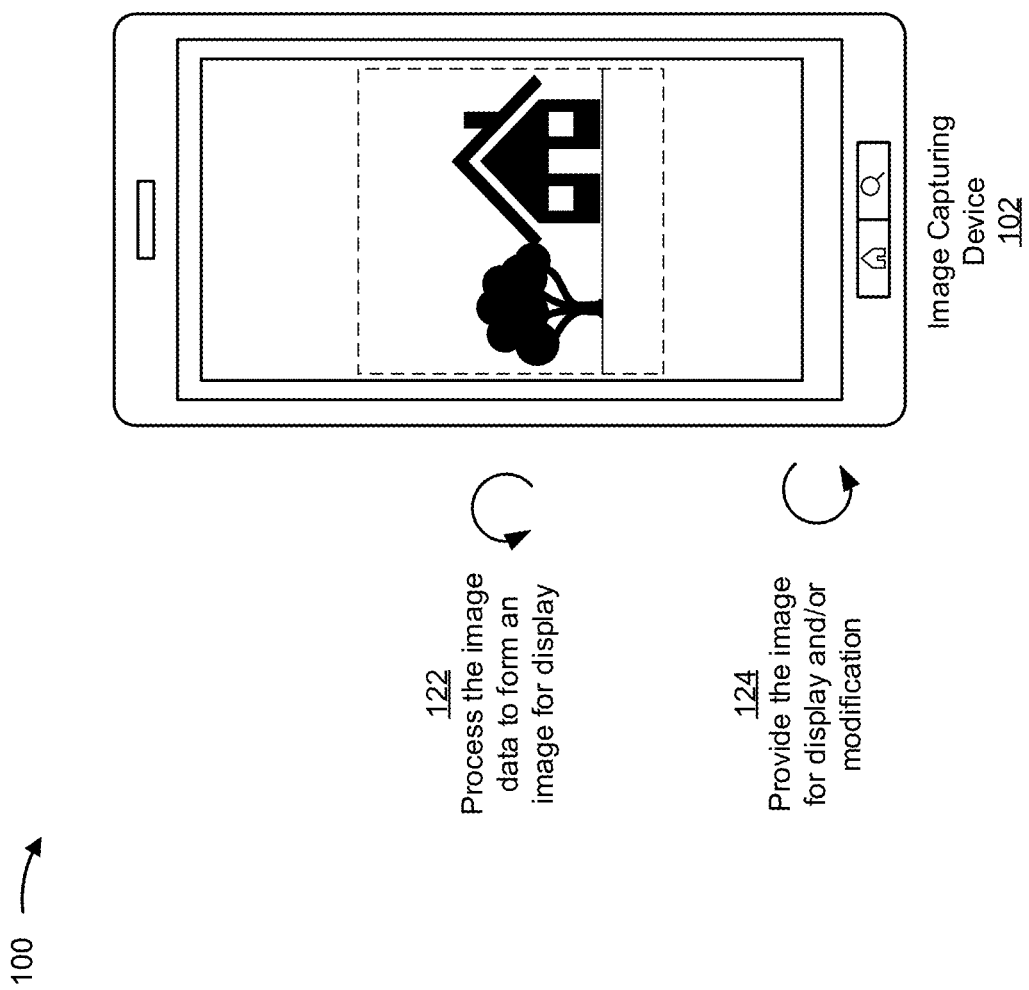

As shown in FIG. 1C, and by reference number 122, the image capturing device 102 may process the image data to form an image for display and/or modification. For example, the image capturing device 102 may process the image to format the image data from raw data into a positive formatted image file (e.g., into a file format that is readable by a computing device to produce the image for display). The image capturing device 102 may process the image for display to the user in response to receiving the confirmation from the image authentication device 104.

As shown by reference number 124, the image capturing device 102 may provide the image for display and/or modification. In some implementations, the image capturing device 102 may prohibit providing the image for display until after providing the hash value of the image data to the image authentication device 104. In some implementations, the image capturing device 102 may provide the image for display (but not editing, sharing, forwarding, extracting from the device, and/or the like) prior to providing the hash value of the image data to the image authentication device 104. For example, the image capturing device 102 may provide the image for display after generating the hash value, after providing the hash value and/or the message to the image authentication device 104, and/or the like.

Figure 1D:
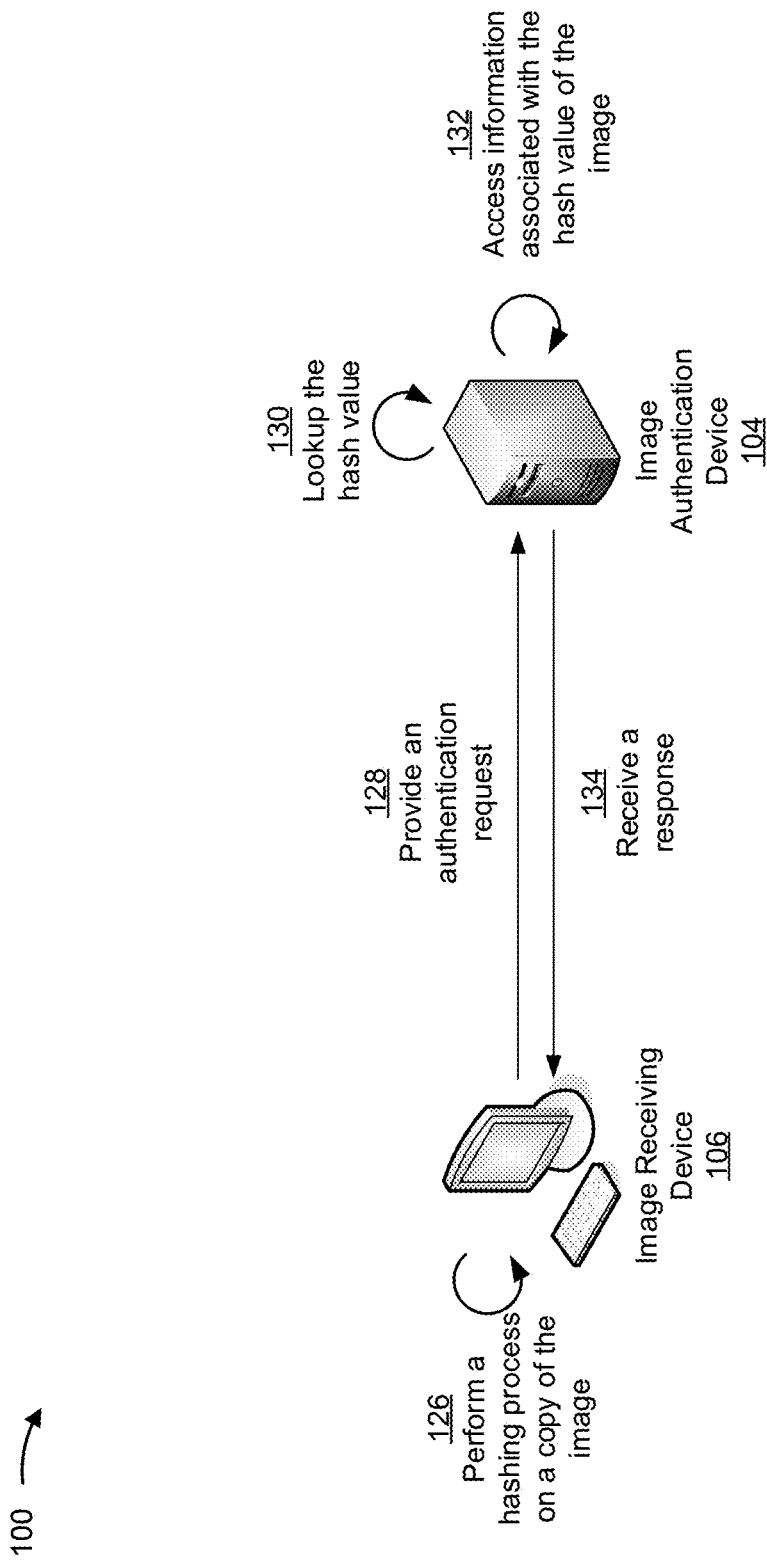

The image capturing device 102 may provide a copy of the image to an image receiving device 106 (see FIG. 1D). A user of the image receiving device 106 may want to determine if the copy of the image is authentic before using computing and networking resources in reliance on an authenticity of the copy of the image. For example, the image receiving device 106 may receive a copy of an image that purports to be an original copy of a contract that entitles the user of the image capturing device 102 to one or more assets. The user of the image receiving device 106 may want to verify that the copy of the image is an unmodified copy of image data captured by the image capturing device 102 (e.g., a scanner) before providing the one or more assets to the user of the image capturing device 102.

As shown in FIG. 1D, and by reference number 126, the image receiving device 106 may perform a hashing process on a copy of the digital image. The image receiving device 106 may perform the same hashing procedure as was performed by the image capturing device 102 to generate a hash value of the copy of the digital image that will match the hash value of the image data if the copy of the digital image is unmodified.

As shown by reference number 128, the image receiving device 106 may provide an authentication request to the image authentication device 104. The authentication request includes the hash value of the copy of the digital image. The authentication request may also include a request for one or more portions of the associated information. For example, the authentication request may include a request for the identification of the image capturing device 102, a time at which the image was captured, a location at which the image was captured, a time at which the hash value of the image data was provided to the image authentication device 104 (e.g., to determine an amount of delay between capturing the image and providing the hash value to the image authentication device 104), and/or the like.

As shown by reference number 130, the image authentication device 104 may look up the hash value. For example, the image authentication device 104 may perform smart contract processing to look up a record, based on the hash value of the copy of the image, storing the hash value of the image data and any associated information. If the image authentication device 104 finds the record storing the hash value (e.g., by matching the hash value of the copy of the image to the hash value of the image data), the image authentication device 104 may determine that the copy of the image is an authentic copy (e.g., a successful authentication of the image), an unmodified copy, and/or an authenticated modified copy. If the image authentication device 104 does not find the record storing the hash value and/or if the hash value of the copy of the image does not match any hash values accessible to the image authentication device 104 via the lookup, the image authentication device 104 may determine that the image authentication device 104 cannot authenticate the copy of the image.

As shown by reference 132, the image authentication device 104 may access any information associated with the hash value of the image. For example, the image authentication device 104 may access information including (e.g., in a record associated with the hash value) the identifier of the image capturing device 102, the time at which the image was captured, the location at which the image was captured, the time at which the hash value of the image data was provided to the image authentication device 104, and/or the like.

As shown by reference number 134, the image receiving device 106 may receive a response from the image authentication device 104. For example, the response may include an indication of whether or not the copy of the image has been validated, information associated with the hash value of the image, and/or the like.

In another example of authenticating a copy of an image, the image receiving device 106 may provide the copy of the image to the image authentication device 104. The image authentication device 104 may perform the hashing process on the copy of the image to obtain the hash value of the copy of the image. The image authentication device 104 may then look up the hash value of the copy of the image, access the information associated with the hash value of the image, provide the response, and/or the like.

By using the image authentication device 104 to authenticate the copy of the image, the image receiving device 106 may detect fraud in transmitting unauthentic modified images and conserve computing and network resources that might otherwise be used to search for corroborating and conflicting evidence, review the evidence, make a determination regarding authenticity of the copy of the image, recover from an incorrect determination of authenticity of the copy of the image, and/or the like.

As indicated above, FIGS. 1A-1D are provided as an example. Other examples can differ from what is described with regard to FIGS. 1A-1D.

Figure 2:
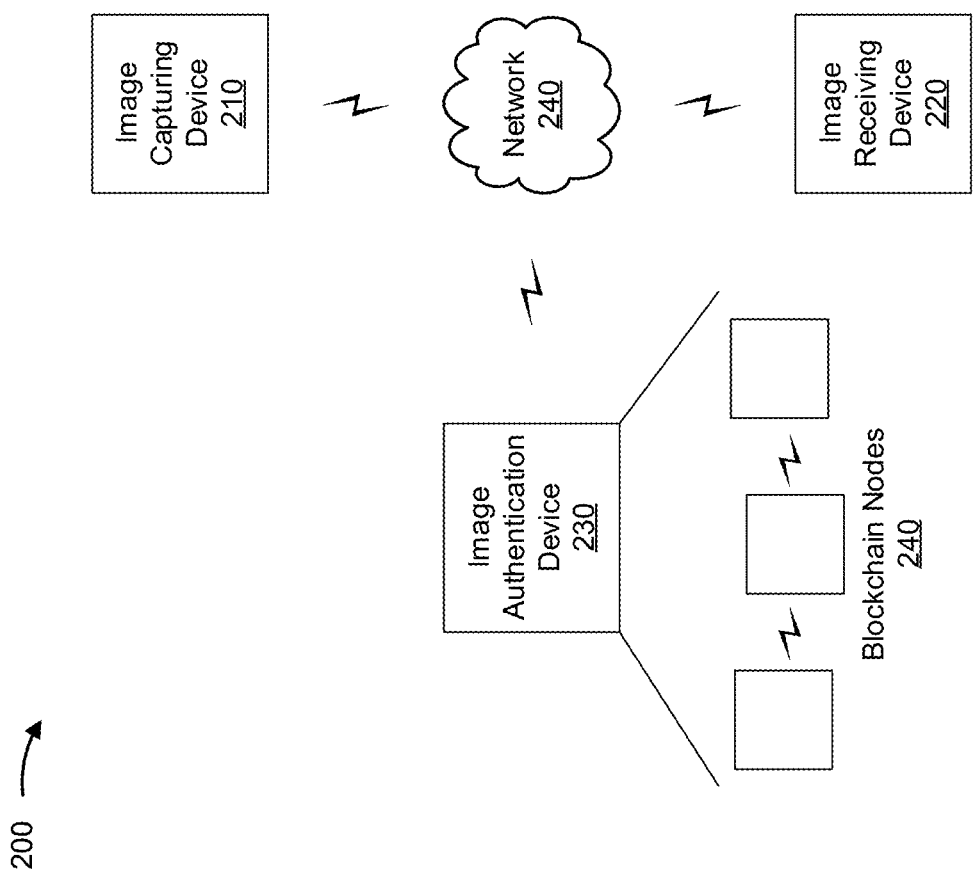
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an image capturing device 210 (e.g., the image capturing device 102), an image receiving device 220 (e.g., the image receiving device 106), an image authentication device 230 (e.g., the image authentication device 104), blockchain nodes 240, and a network 250. Devices of environment 200 may interconnect via wired connections, wireless connections, or a combination of wired and wireless connections.

Image capturing device 210 includes one or more devices capable of capturing image data and receiving, generating, storing, processing, and/or providing information associated with image data. For example, image capturing device 210 may include a computing device, such as a mobile phone (e.g., a smart phone, a radiotelephone, and/or the like), a scanner, internet of things device with a camera function, a camera component of a vehicle, a laptop computer, a tablet computer, a handheld computer, a desktop computer, a gaming device, a wearable device (e.g., a smart wristwatch, a pair of smart eyeglasses, and/or the like), or a similar type of device.

Image receiving device 220 includes one or more devices capable of receiving, generating, storing, processing, and/or providing information associated with receiving and authenticating a copy of an image. For example, image receiving device 220 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Image authentication device 230 includes one or more devices capable of storing, processing, and/or routing information associated with one or more hash values and/or associated information. Image authentication device 230 may provide an interface for image capturing device 210 and/or image receiving device 220 to access blockchain nodes 240. In some implementations, image receiving device 220 may include a communication interface that allows image receiving device 220 to receive information from and/or transmit information to other devices in environment 200.

Blockchain nodes 240 may be part of a network that is able to utilize a distributed ledger to store and/or access records relating to hash values of images, associated information, and the like, as described herein. In some implementations, blockchain nodes 240 may provide a blockchain for hash values, associated information, and/or the like.

One or more nodes of the blockchain nodes 240 include one or more devices capable of receiving, generating, storing, processing, and/or providing information associated with a contract and/or smart contract. For example, one or more nodes of the blockchain nodes 240 may include a computing device (e.g., a desktop computer, a laptop computer, a tablet computer, a handheld computer, a server device, and/or the like), a mobile phone (e.g., a smart phone, a radiotelephone, and/or the like), or a similar device. In some implementations, one or more nodes of the blockchain nodes 240 may be a device associated with an entity, such as an organization, a subsidiary of the organization, an individual, and/or the like. In some implementations, one or more nodes of the blockchain nodes 240 may be associated with multiple organizations, multiple subsidiaries of an organization, multiple individuals, and/or the like.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
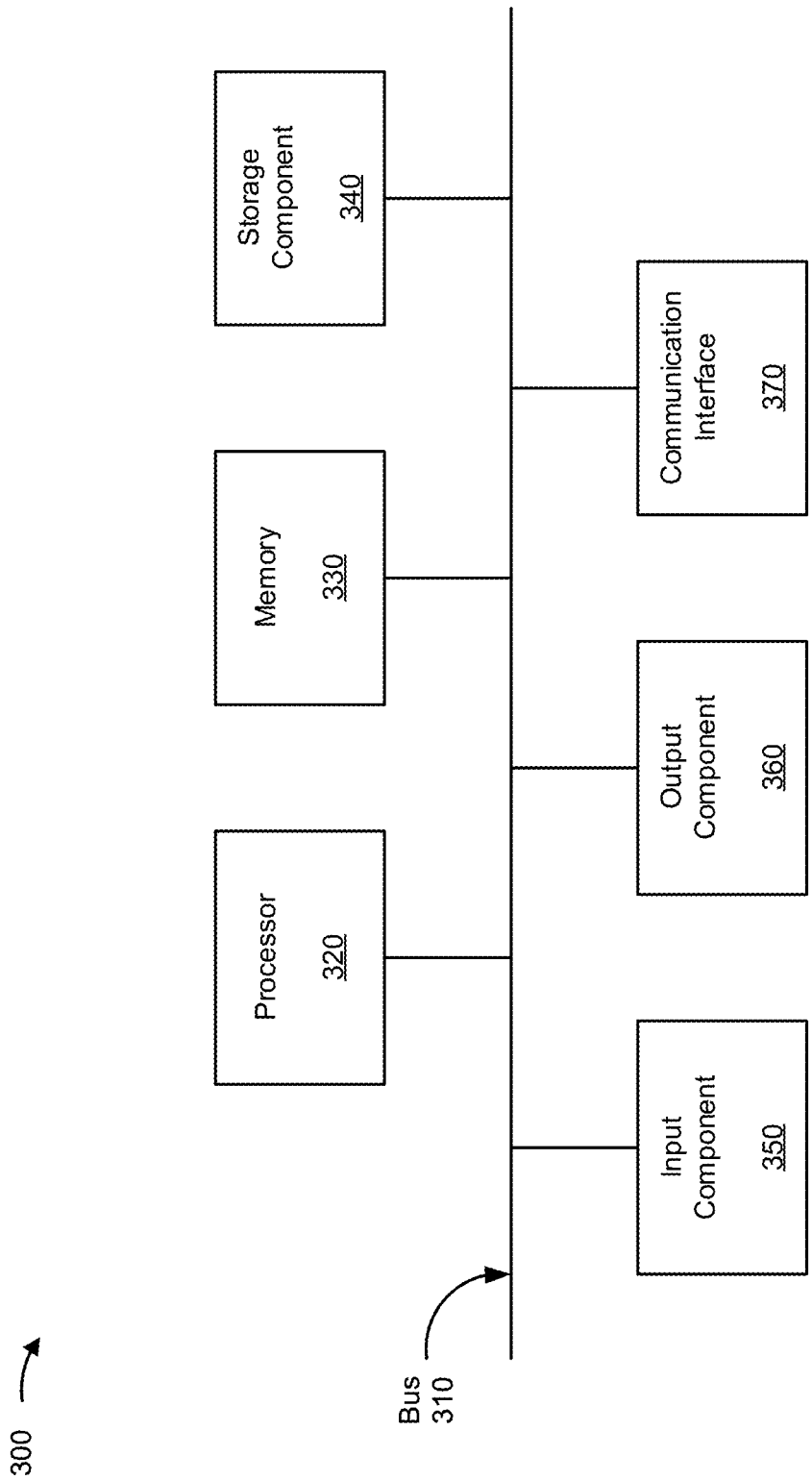
FIG. 3 is a diagram of example components of one or more devices of FIG. 2.

FIG. 3 is a diagram of example components of a device 300. Device 300 may correspond image capturing device 210, image receiving device 220, image authentication device 230, and/or blockchain nodes 240. In some implementations, image capturing device 210, image receiving device 220, image authentication device 230, and/or blockchain nodes 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for systems and methods for authenticating an image. In some implementations, one or more process blocks of FIG. 4 may be performed by an image capturing device (e.g., image capturing device 210). In some implementations, one or more process blocks of FIG. 4 may be performed by another device or a group of devices separate from or including the image capturing device, such as an image receiving device (e.g., image receiving device 220), an image authentication device (e.g., image authentication device 230), and a blockchain node (e.g., blockchain nodes 240), and/or the like.

As shown in FIG. 4, process 400 may include capturing image data for processing to form an image (block 410). For example, the image capturing device (e.g., using processor 320, memory 330, storage component 340, input component 350, output component 360, communication interface 370 and/or the like) may capture image data for processing to form an image, as described above.

As further shown in FIG. 4, process 400 may include performing a hashing procedure on the image data, wherein performing the hashing procedure generates a hash value of the image data (block 420). For example, the image capturing device (e.g., using processor 320, memory 330, storage component 340, input component 350, output component 360, communication interface 370 and/or the like) may perform a hashing procedure on the image data, as described above. In some implementations, performing the hashing procedure generates a hash value of the image data.

As further shown in FIG. 4, process 400 may include providing, to an image authentication device, the hash value of the image data (block 430). For example, the image capturing device (e.g., using processor 320, memory 330, storage component 340, input component 350, output component 360, communication interface 370 and/or the like) may provide, to an image authentication device, the hash value of the image data, as described above. In some implementations, the hash value of the image data is to be used by the image authentication device to validate the image based on a request to authenticate the image received from a receiving device. In some implementations, the image capturing device may allow display, but not editing or sharing of the image until confirmation that the image authentication device has received the hash value and/or stored the hash value in a data structure (e.g., a block of a blockchain network or the like).

As further shown in FIG. 4, process 400 may include processing the image data to form the image for display to a user (block 440). For example, the image capturing device (e.g., using processor 320, memory 330, storage component 340, input component 350, output component 360, communication interface 370 and/or the like) may process the image data to form the image for display to a user, as described above.

As further shown in FIG. 4, process 400 may include receiving, from the image authentication device, a confirmation that the hash value has been stored (block 450). For example, the image capturing device (e.g., using processor 320, memory 330, storage component 340, input component 350, output component 360, communication interface 370 and/or the like) may receive, from the image authentication device, a confirmation that the hash value has been stored, as described above.

As further shown in FIG. 4, process 400 may include providing, in response to receiving the confirmation, the image for display to the user (block 460). For example, the image capturing device (e.g., using processor 320, memory 330, storage component 340, input component 350, output component 360, communication interface 370 and/or the like) may provide, in response to receiving the confirmation from the image authentication device, the image for display to the user, as described above.

Process 400 may include additional implementations, such as any single implementation or any combination of implementations described below and/or in connection with one or more other processes described elsewhere herein.

In a first implementation, process 400 includes providing, to the image authentication device, a device identifier to associate with the hash value, wherein the device identifier indicates that the image capturing device captured the image data associated with the hash value.

In a second implementation, alone or in combination with the first implementation, process 400 includes providing, to the image authentication device, an indication of one or more of a location or a time at which the image capturing device captured the image data.

In a third implementation, alone or in combination with one or more of the first and second implementations, providing, to the image authentication device, the hash value of the image data comprises automatically, and without user input, providing, to the image authentication device, the hash value of the image data.

In a fourth implementation, alone or in combination with one or more of the first through third implementations, process 400 includes providing, to the image authentication device, a digital signature generated using a private key of the image capturing device, wherein the digital signature is to be used by the image authentication device to verify the image capturing device as a source of the hash value of the image data.

In a fifth implementation, alone or in combination with one or more of the first through fourth implementations, process 400 includes determining that a network connection is unavailable for providing the hash value of the image to the image authentication device; and generating a message to provide to the image authentication device when the network connection becomes available, wherein the message includes the hash value.

In a sixth implementation, alone or in combination with one or more of the first through fifth implementations, process 400 includes applying, after capturing the image data and before performing the hashing procedure, processing filters specific to an image capturing component of the image capturing device.

In a seventh implementation, alone or in combination with one or more of the first through sixth implementations, capturing the image data comprises capturing the image data by an image capturing component, wherein the image capturing component comprises a digital camera or a scanning component.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like, depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   applying, by a device, a hashing function on image data associated with an image, to generate a hash value unique to the image data; providing, by the device to another device and based on generating the hash value, the hash value;
   receiving, by the device and based on providing the hash value, a message, from the another device, indicating that the hash value is unique and associated with a record storing the hash value; and
   processing, by the device and based on receiving the message, the image data to form a modification of the image.

2. The method of claim 1, further comprising:
   generating a second message, including the hash value, for verifying an authenticity of the image,
   wherein providing the hash value comprises:
   providing, to the other device and based on generating second message, the second message.

3. The method of claim 1, wherein the message is a storage confirmation message confirming that the record has been generated to store the hash value on a block of a blockchain.

4. The method of claim 1, further comprising:
   capturing, by the device, the image data,
   wherein applying the hashing function comprises:
   applying, based on capturing the image data, the hash function.

5. The method of claim 4, further comprising:
   applying, after capturing the image data and before applying the hashing function, one or more processing filters specific to an image capturing component of the device.

6. The method of claim 1, further comprising:
   automatically generating, based on applying the hashing function and without user input, the hash value.

7. The method of claim 1, wherein providing the hash value comprises:
   automatically providing, to the other device and based on generating the hash value, the hash value with user input.

8. The method of claim 1, further comprising:
   disabling, prior to receiving the message, at least one of one or more sharing tools or one or more editing tools.

9. The method of claim 1, further comprising:
   enabling, based on receiving the message, at least one of one or more sharing tools or one or more editing tools.

10. A device, comprising:
    one or more processors, communicatively coupled to one or more memories, configured to: perform a hashing process on image data, associated with an image, to generate a hash value unique to the image data;

provide, to another device and based on generating the hash value, a first message including the hash value and an indication of one or more attributes associated with the image data;

receive, from the another device and based on providing the hash value, a second message indicating that the hash value is unique and associated with a record storing the hash value; and process, based on receiving the second message, the image data to form the image for at least one of a display or a modification of the image.

11. The device of claim 10, wherein the one or more processors are further configured to:

determine the one or more attributes of the image data, wherein the first message includes the hash value and the indication of the one or more attributes.

12. The device of claim 10, wherein the one or more attributes of the image data comprises at least one of:

location data associated with a capturing of the image data;

time data associated with the capturing of the image data; or a device identifier that indicates that a third device that captures the image data.

13. The device of claim 10, wherein the one or more processors are further configured to:

perform a second hashing process on the one or more attributes associated with the image data to generate one or more additional hash values unique to the one or more attributes, wherein the one or more processors, when providing the first message, are to:

provide, to the other device and based on generating the hash value and the one or more additional hash values, the first message, wherein the first message includes the hash value and the one or more additional hash values.

14. The device of claim 10, wherein the first message includes a digital signature for the other device to use to verify the device as a source of the hash value of the image data.

15. The device of claim 14, wherein the digital signature is generated using a private key associated with the device, and wherein the digital signature allows the other device to use the digital signature and an associated public key to verify the device as a source of the hash value of the image data.

16. A non-transitory computer-readable medium storing instructions, the instructions comprising: one or more instructions that, when executed by one or more processors of a device, cause the one or more processors to:

receive image data associated with a copy of an image;

apply a hashing function on the image data to generate a hash value unique to the copy of the image; provide, to another device and based on generating the hash value, the hash value;

receive, from the another device and based on providing the hash value, a message indicating that the copy of the image is authentic such that the hash value is unique and associated with a record storing the hash value; and process, by the device and based on receiving the message, the image data to form a modification of the copy of the image.

17. The non-transitory computer-readable medium of claim 16, wherein the one or more instructions that, when executed by the one or more processors of the device, further cause the one or more processors, when providing the hash value, to:

provide a second message including the hash value and a request for information associated with the copy of the image, wherein the message includes the information.

18. The non-transitory computer-readable medium of claim 17, wherein the information includes at least one of:

a request for an identification of a third device capturing the image data, time data associated with a capturing of the image data, or location data associated with the capturing of the image data.

19. The non-transitory computer-readable medium of claim 16, wherein the one or more instructions that, when executed by the one or more processors of the device, further cause the one or more processors, when receiving the copy of the image, to:

receive the copy of the image from a third device.

20. The non-transitory computer-readable medium of claim 16, wherein the copy of the image is an unmodified version of an original of the image, and wherein the hashing value of the copy of the image matches a hashing value associated with the original of the image.

* * * * *